(12) United States Patent
Shrestha et al.

(10) Patent No.: US 12,225,610 B2
(45) Date of Patent: Feb. 11, 2025

(54) RRC REESTABLISHMENT BETWEEN TN AND NTN

(71) Applicant: QUALCOMM Incorporated, San Diego, CA (US)

(72) Inventors: Bharat Shrestha, San Diego, CA (US); Mungal Singh Dhanda, Slough (GB); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 17/657,334

(22) Filed: Mar. 30, 2022

(65) Prior Publication Data

US 2023/0319929 A1 Oct. 5, 2023

(51) Int. Cl.
*H04W 76/16* (2018.01)
*H04W 36/00* (2009.01)
*H04W 76/19* (2018.01)

(52) U.S. Cl.
CPC ....... *H04W 76/16* (2018.02); *H04W 36/0027* (2013.01); *H04W 36/0069* (2018.08); *H04W 36/00835* (2018.08); *H04W 76/19* (2018.02)

(58) Field of Classification Search
CPC ............. H04W 76/16; H04W 36/0027; H04W 36/0069; H04W 36/00835; H04W 36/0079; H04W 36/0055; H04W 76/19
See application file for complete search history.

(56) References Cited

U.S. PATENT DOCUMENTS

| 11,963,049 | B2* | 4/2024 | Shi | H04W 48/12 |
|---|---|---|---|---|
| 2016/0095004 | A1* | 3/2016 | Tseng | H04W 76/16 370/329 |
| 2016/0353361 | A1* | 12/2016 | Jung | H04W 48/16 |
| 2020/0068547 | A1* | 2/2020 | Li | H04W 72/51 |
| 2020/0120580 | A1* | 4/2020 | Jin | H04W 72/54 |
| 2020/0213000 | A1* | 7/2020 | Arur | H04B 7/1851 |
| 2022/0046498 | A1* | 2/2022 | Cheng | H04W 36/0085 |

(Continued)

FOREIGN PATENT DOCUMENTS

WO 2021208072 A1 10/2021

OTHER PUBLICATIONS

International Search Report and Written Opinion—PCT/US2023/016325—ISA/EPO—Jul. 7, 2023.

(Continued)

*Primary Examiner* — Un C Cho
*Assistant Examiner* — Lalita W Pace
(74) *Attorney, Agent, or Firm* — Procopio, Cory, Hargreaves & Savitch LLP

(57) ABSTRACT

Method and apparatus for an RRC reestablishment procedure between a TN and an NTN. The apparatus may be on a first network associated with one of the TN or the NTN. The apparatus transmits a RRC connection request to establish a connection with a second network associated with one of the NTN or the TN. The apparatus receives an RRC reconnection message from a network entity associated with the second network. The apparatus transmits an RRC reconnection complete message to the network entity associated with one of the NTN or the TN of the second network. The apparatus may transmit a registration update request to the network entity associated with one of the NTN or the TN of the second network.

28 Claims, 13 Drawing Sheets

(56) References Cited

U.S. PATENT DOCUMENTS

| | | | |
|---|---|---|---|
| 2022/0353799 A1* | 11/2022 | Talebi Fard | H04W 48/16 |
| 2023/0035046 A1 | 2/2023 | You et al. | |
| 2023/0276333 A1* | 8/2023 | Wu | H04W 36/305 |
| | | | 370/331 |
| 2023/0318794 A1* | 10/2023 | Shankaranarayanan | |
| | | | H04W 72/0453 |
| | | | 370/329 |
| 2023/0319938 A1* | 10/2023 | Wu | H04W 76/20 |
| | | | 370/329 |

OTHER PUBLICATIONS

Qualcomm Incorporated: "NB-IoT TN-NTN Mobility for CP-CIoT", 3GPP TSG-SA WG2 Meeting #150-e, S2-2202004, 3rd Generation Partnership Project, Mobile Competence Centre, 650, Route Des Lucioles, F-06921 Sophia-Antipolis Cedex, France, vol. SA WG2, No. E-Meeting, Apr. 6, 2022-Apr. 12, 2022, Mar. 29, 2022, 3 Pages, XP052132858, Title, p. 1-step 1, 2, lines 6-9, lines 1-2, p. 3, line 4, para 4.13.x, lines 11-13, para 4.13.x, lines 2-5, para 5.3.4b.X.

Qualcomm: "TN-NTN NB-IoT Mobility for CP-CIoT", 3GPP TSG-WG SA2 Meeting #150E, S2-2202003, 3rd Generation Partnership Project, Mobile Competence Centre, 650, Route Des Lucioles, F-06921 Sophia-Antipolis Cedex, France, vol. SA WG2, No. Elbonia, Apr. 6, 2022-Apr. 12, 2022, Mar. 29, 2022, XP052132857, 8 pages, Item 2, p. 5, p. 5-6.

* cited by examiner

```
ReestabUE-Identity ::= SEQUENCE {
    c-RNTI          C-RNTI,
    physCellId      PhysCellId,
    shortMAC-I      ShortMAC-I
}
```

FIG. 5

RRC REESTABLISHMENT BETWEEN TN AND NTN

TECHNICAL FIELD

The present disclosure relates generally to communication systems, and more particularly, to a configuration for radio resource control (RRC) reestablishment between a terrestrial network (TN) and a non-terrestrial network (NTN).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus may be a UE on a first network associated with one of a terrestrial network (TN) or a non-terrestrial network (NTN). The apparatus transmits a radio resource control (RRC) connection request to establish a connection with a second network associated with one of the NTN or the TN. The apparatus receives an RRC reconnection message from a network entity associated with the second network. The apparatus transmits an RRC reconnection complete message to the network entity associated with one of the NTN or the TN of the second network.

In an aspect of the disclosure, a method, a computer-readable medium, and an apparatus are provided. The apparatus may be a device at a network entity. The device may be a processor and/or a modem at a network entity or the network entity itself. The apparatus may be a network entity on a second network associated with one of a non-terrestrial network (NTN) or a terrestrial network (TN). The apparatus receives, from a user equipment (UE) on a first network associated with one of the TN or the NTN, a radio resource control (RRC) connection request to establish a connection with the second network. The apparatus transmits an RRC reconnection message in response to receiving the RRC connection request. The apparatus receives an RRC reconnection complete message from the UE previously associated with the first network.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 5 is a diagram illustrating an example of a Reestablishment information element (IE).

DETAILED DESCRIPTION

Figure 1:
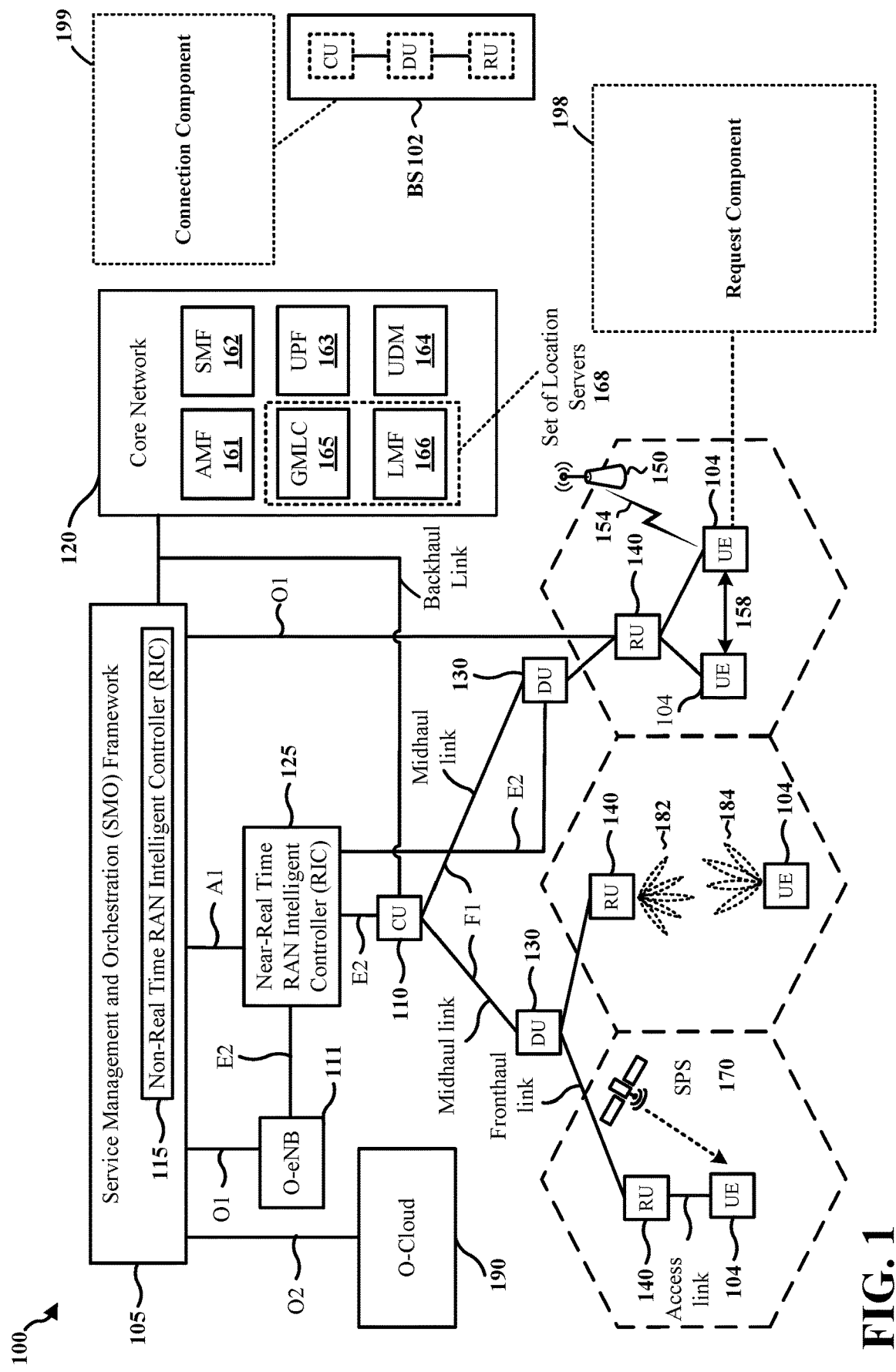
FIG. 1 is a diagram illustrating an example of a wireless communications system and an access network.

In wireless communications, a UE might have access to different networks. For example, the UE might have access to TN and NTN systems. In some instances, the mobility management entity (MME) of the core network may support both TN and NTN systems, such that the MME is connected to both the TN and the NTN systems. In some instances, a base station may also be configured to support connections via both TN and NTN systems. In some instances, such as when the UE enters into a radio link failure state, a suspended state, or RRC inactive state in one network (e.g., TN or NTN), the UE may be able to continue connection in the other network (e.g., NTN or TN). However, the UE would need to trigger a registration update when moving between the TN and the NTN, due to the switch being considered an inter-radio access technology (RAT) cell selection, and an RRC reestablishment may not be possible. The target network (e.g., NTN) may be confused by the registration update request from the UE, because the target network may not be able to determine whether the registration update request is from a same or different network (e.g., TN) Aspects presented herein provide a configuration that allows for RRC reestablishment between a TN and a NTN. The aspects presented herein may allow a UE to perform an RRC reestablishment procedure between different network types. For example, the UE may perform the RRC reestablishment procedure when moving from a TN to a NTN, or vice versa. At least one advantage of the disclosure is that a UE may perform RRC reestablishment and switch between a TN and a NTN without the loss of pending data packets.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190)

to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a request component 198 configured to transmit a radio resource control (RRC) connection request to establish a connection with a second network associated with one of the NTN or the TN; receive an RRC reconnection message from a network entity associated with the second network; and transmit an RRC reconnection complete message to the network entity associated with one of the NTN or the TN of the second network.

Referring again to FIG. 1, in certain aspects, the base station 102 may include a connection component 199 configured to receive, from a UE on a first network associated with one of the TN or the NTN, a RRC connection request to establish a connection with the second network; transmit an RRC reconnection message in response to receiving the RRC connection request; and receive an RRC reconnection complete message from the UE previously associated with the first network.

Although the following description may be focused on 5G NR, the concepts described herein may be applicable to other similar areas, such as LTE, LTE-A, CDMA, GSM, and other wireless technologies.

Figure 2:
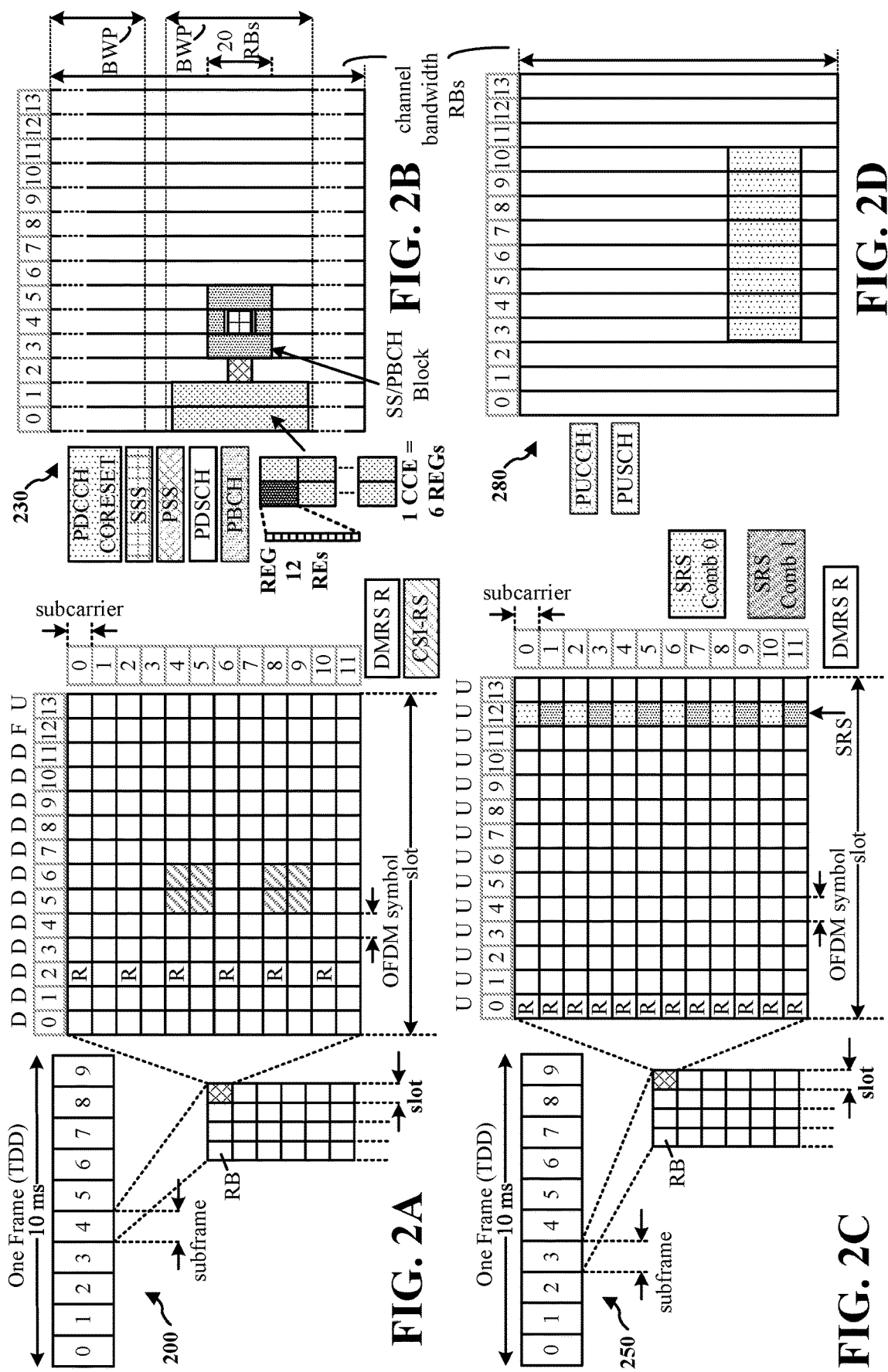
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>Δf = $2^μ$ · 15 [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^μ$ slots/subframe. The subcarrier spacing may be equal to $2^μ*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
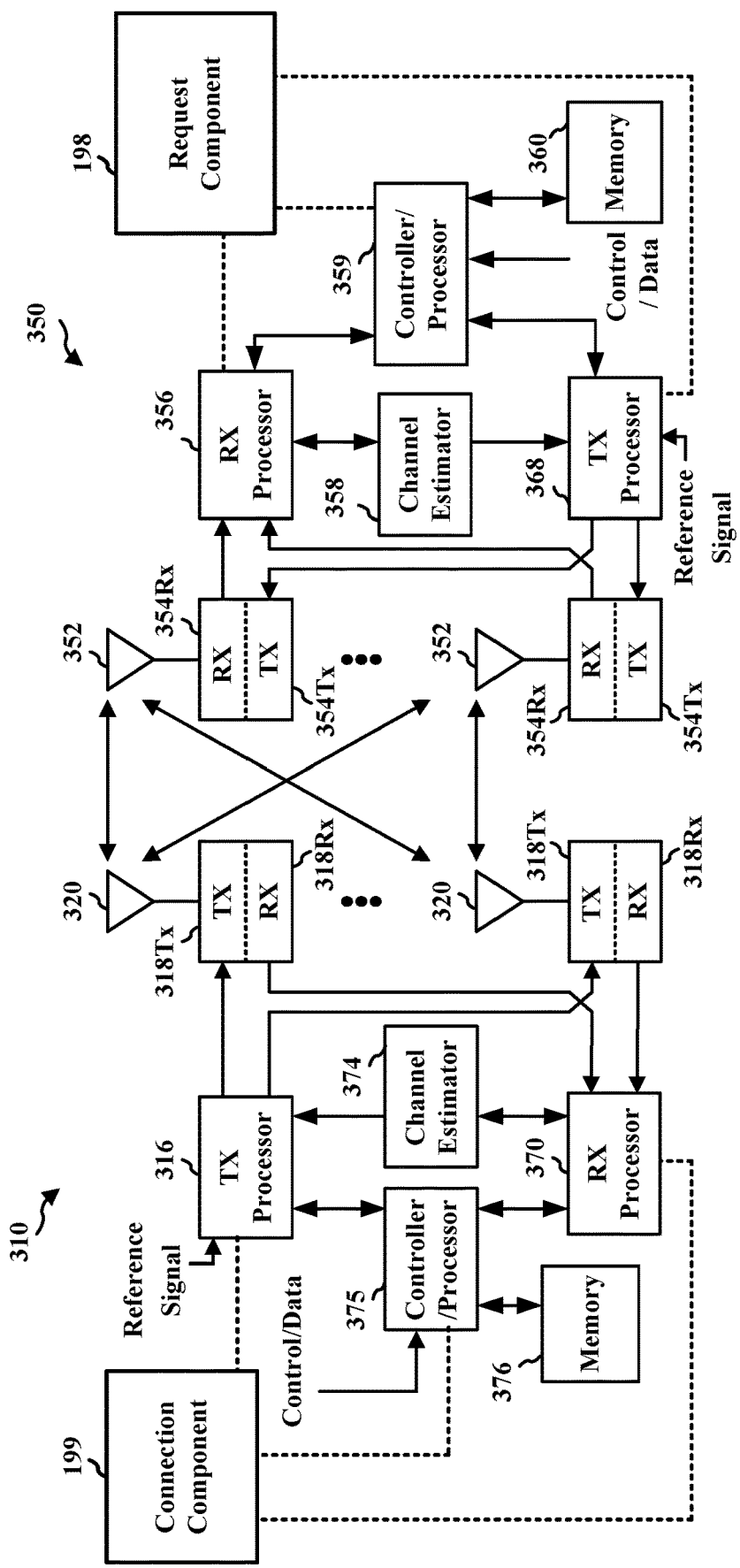
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the request component 198 of FIG. 1.

At least one of the TX processor 316, the RX processor 370, and the controller/processor 375 may be configured to perform aspects in connection with the connection component 199 of FIG. 1.

Figure 4:
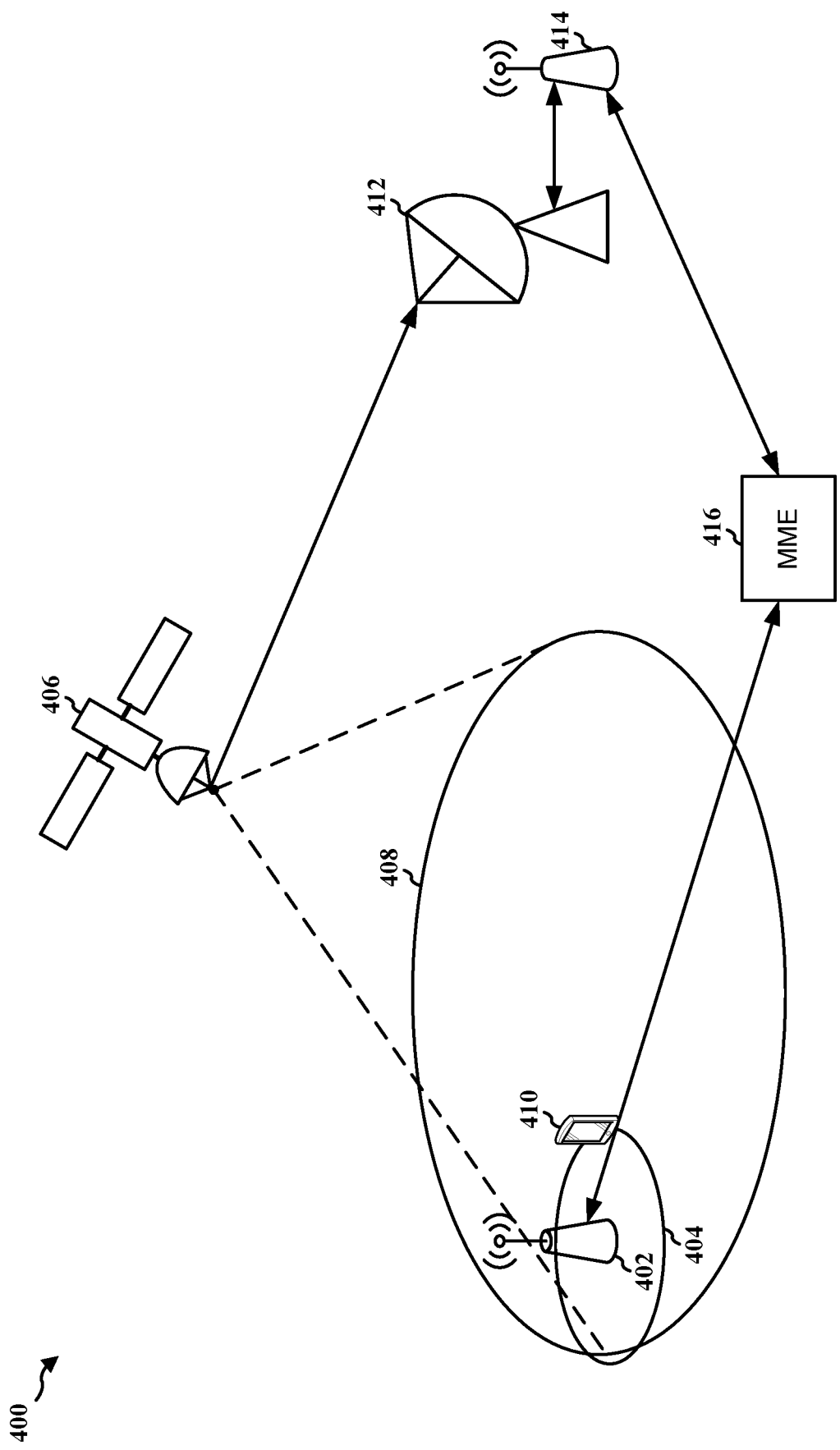
FIG. 4 is a diagram illustrating an example of a TN and NTN systems.

In wireless communications, a UE might have access to different networks. For example, the UE might have access to TN and NTN systems. In some instances, the mobility management entity (MME) of the core network may support both TN and NTN systems, such that the MME is connected to both the TN and the NTN systems. With reference to diagram 400 of FIG. 4, a base station 402 may provide a first cell 404 as part of the TN system, while a satellite 406 may provide a second cell 408 as part of the NTN system. The UE 410 may be able to connect to the first cell 404 or the second cell 408. The base station 402 may communicate with the MME 416. The satellite 406 may also communicate with the MME 416, via a gateway 412 and a base station 414 which provide a communication link between the MME 416 and the satellite 406. In some instances, a base station may also be configured to support connections via both TN and NTN systems.

The UE 410 may be configured with equivalent PLMNs that belong to both a TN and a NTN, such that the PLMN supports both the TN and the NTN. In such instances, when the UE 410 enters into a radio link failure state, a suspended state, or RRC inactive state in one network (e.g., TN or NTN), the UE may be able to continue connection in the other network (e.g., NTN or TN). However, the UE would need to trigger a registration update when moving between the TN and the NTN, due to the switch being considered an inter-radio access technology (RAT) cell selection, and an RRC reestablishment may not be possible. Initiating the registration update may result in pending downlink data to be lost. In some instances, a UE (e.g., narrowband (NB) IoT using control plane (CP) cellular IoT (CIoT)) may be allowed to continue RRC reestablishment when moving from a TN to an NTN, due to the RRC reestablishment is MME based mobility.

The target network may be confused by the registration update request from the UE, when resuming from a suspended state or reestablished connection after a radio link failure, because the target network may not be able to determine whether the registration update request is from a same or different network. This confusion may result in the target network rejecting the registration update request from the UE. However, the target network rejection is unnecessary and should be avoided.

In instances where the UE is performing a reestablishment procedure, the target network entity may identify the source network entity based on an identification provided by the UE in a request message. For example, with reference to the diagram 500 of FIG. 5, the request message may comprise an indication 502 comprising ReestabUE-Identity, which may identify the source network entity of the UE. The target network entity may retrieve UE capability and any pending downlink packets to deliver to the UE, based on the indication 502. The ReestabUE-Identity includes C-RNTI and physical (PHY) cell identifier (ID), but the target network entity may not be able to determine if the particular combination of C-RNTI and PHY cell ID is associated with a TN or NTN system. The issue may arise in instances where the C-RNTI is the same between the TN and NTN. A similar issue may occur if the UE is resuming from a suspended state or RRC inactive state.

Aspects presented herein provide a configuration that allows for RRC reestablishment between a TN and a NTN. The aspects presented herein may allow a UE to perform an RRC reestablishment procedure between different network types. For example, the UE may perform the RRC reestablishment procedure when moving from a TN to a NTN, or vice versa. At least one advantage of the disclosure is that a UE may perform RRC reestablishment and switch between a TN and a NTN without the loss of pending data packets.

In instances where a UE selects a cell belonging to a different network, the target network may configure different sets of tracking area identities for the UE, such that the UE may trigger a registration update. The UE selecting a cell originally on a TN to a NTN indicates to the UE that the UE has moved out of its registration area. The target network may indicate, in system information, whether the cell associated with the target network supports reestablishment between a TN and a NTN, which may be per public land mobile network (PLMN). In such instances, the UE may continue the reestablishment or resumption, and after successful connection, the UE may send the registration update request. The RRC reestablishment complete message (e.g., Msg5, ACK to Msg4) may be extended to include DedicatedInfoNAS to carry the registration update request. The network may identify the change of TN/NTN and provide the UE with a larger grant (e.g., uplink shared channel (UL-SCH) resource) to include non-access stratum (NAS) packet data units.

In order to avoid a delay in pending downlink data delivery, the RRC reestablishment message (e.g., Msg4) in downlink may also be extended to include DedicatedInfoNAS to carry any downlink NAS PDU. This may be allowed prior to the UE sending a tracking area update or registration update request to the core network. In some instances, the registration request (e.g., TAU request) procedure may be prioritized over any uplink or downlink data transmission. In some instances, uplink or downlink data transmission may be prioritized over the registration request.

In some aspects, the UE may continue the reestablishment or resumption procedure without the need for sending the registration update request. In such instances, the core network may detect that the UE has changed tracking area configuration and implicitly configures the UE with a new registration area for the new network when the UE is in a RRC CONNECTED state.

In some aspects, the UE may abort the reestablishment or resumption procedure and may enter a RRC IDLE state. In such instances, the UE may start the cell selection process over and select a new cell that belongs to a different network (e.g., TN or NTN). The UE may abort the reestablishment or resumption procedure in instances where the UE selects a cell associated with a different network. For example, the UE may be on a TN and in the process of selecting a new cell, selects a cell associated with a NTN, the UE, in response to selecting the cell associated with the NTN, may abort the reestablishment or resumption procedure.

In some aspects, in order to determine network differentiation, the network may blindly poll one or more base stations in the target network and source network that may know the PHY cell ID and C-RNTI of the UE. For example, the target network (e.g., NTN) may poll the base stations of the NTN and the source network (TN). In some instances, there may be another combination of cell ID and C-RNTI that is the same being used by another UE, while the MAC-I not being able to be verified.

In some aspects, in order to determine network differentiation, the network may provide PHY cell IDs between the TN and NTN, such that there is no overlapping of PHY cell IDs between the TN and the NTN. In some instances, the PHY cell IDs may be grouped between the TN and the NTN. In such instances, the network may determine that the UE was previously connected to a TN or a NTN based on the PHY cell ID. In some instances, the UE may have been previously connected to a high altitude platform system (HAPS) where the PHY cell ID may be overlapped or moved away when the target network tries to enquire; the grouping of PHY cell ID between TN and NTN may resolve such issue.

In some aspects, PHY cell ID for TN and NTN may include an integer identifier. The integer identifier (e.g., PhysCellIdNR-r15, PhysCellIdNTN-r17) may allow for identification of the source network (e.g., TN or NTN). The identifier may be comprised within the RRC connection reestablishment request. For example, a new critical extension may be defined in the RRC connection reestablishment request that comprises the identifier. System information may be configured to indicate whether the cell supports the integer identifier.

Figure 6:
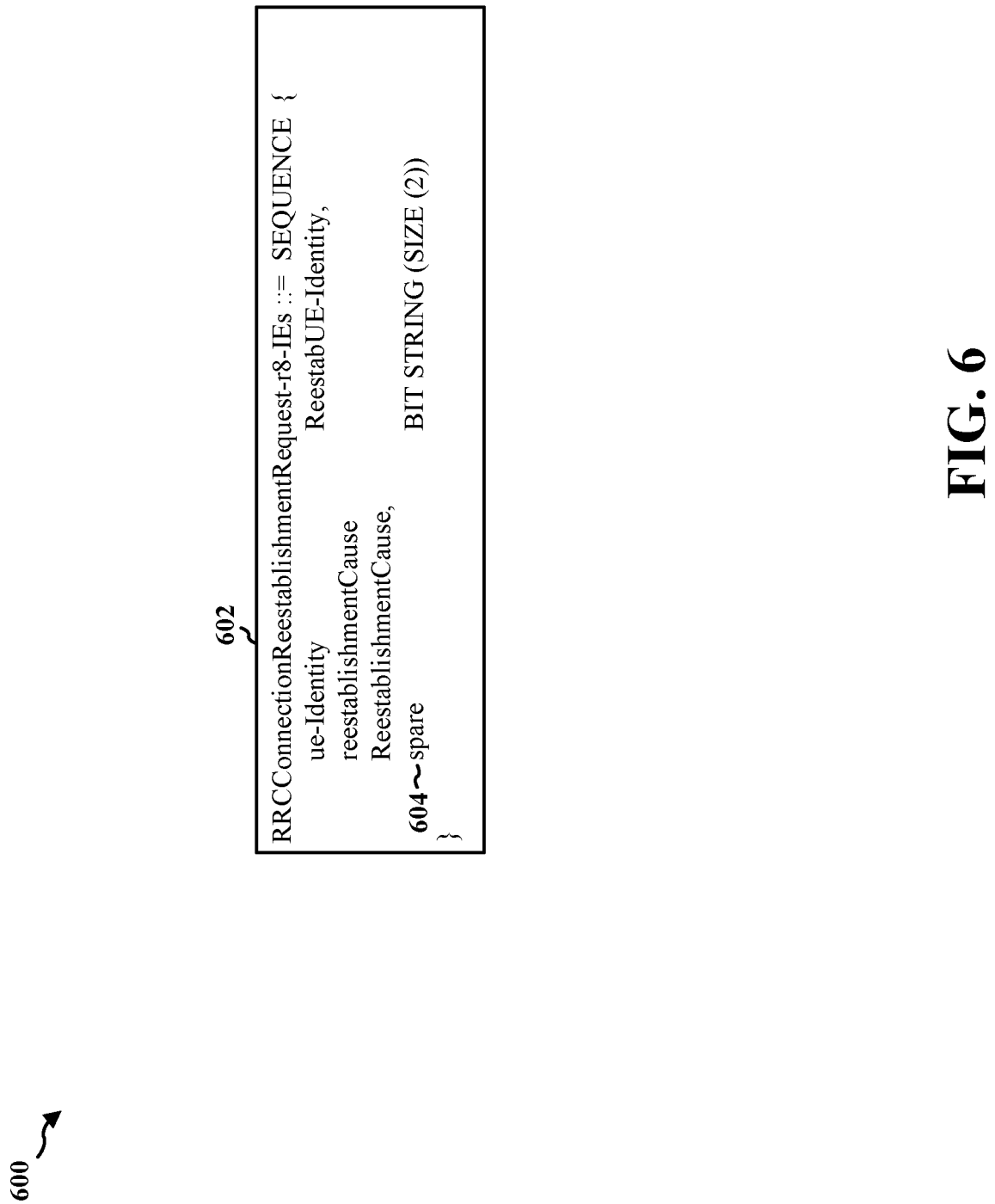
FIG. 6 is a diagram illustrating an example of Reestablishment IE.

In some aspects, the RRC reestablishment request message may comprise a flag identifier. The flag identifier may indicate that the UE is reestablishing the connection from a different network. For example, if the RRC reestablishment request message is sent to a NTN, then the UE was previously on a TN. The flag identifier may be comprised in a spare bit. With reference to diagram 600 of FIG. 6, the spare 604 of the RRC reestablishment request message 602 may be utilized as the flag identifier. In such instances, if the target network does not support reestablishment between TN and NTN, then the target network may send a rejection message or RRC connection setup message.

In some aspects, a dedicated or PRACH partition may be used for differentiation. For example, the dedicated or PRACH partition may be used for differentiation from a Msg1.

Figure 7:
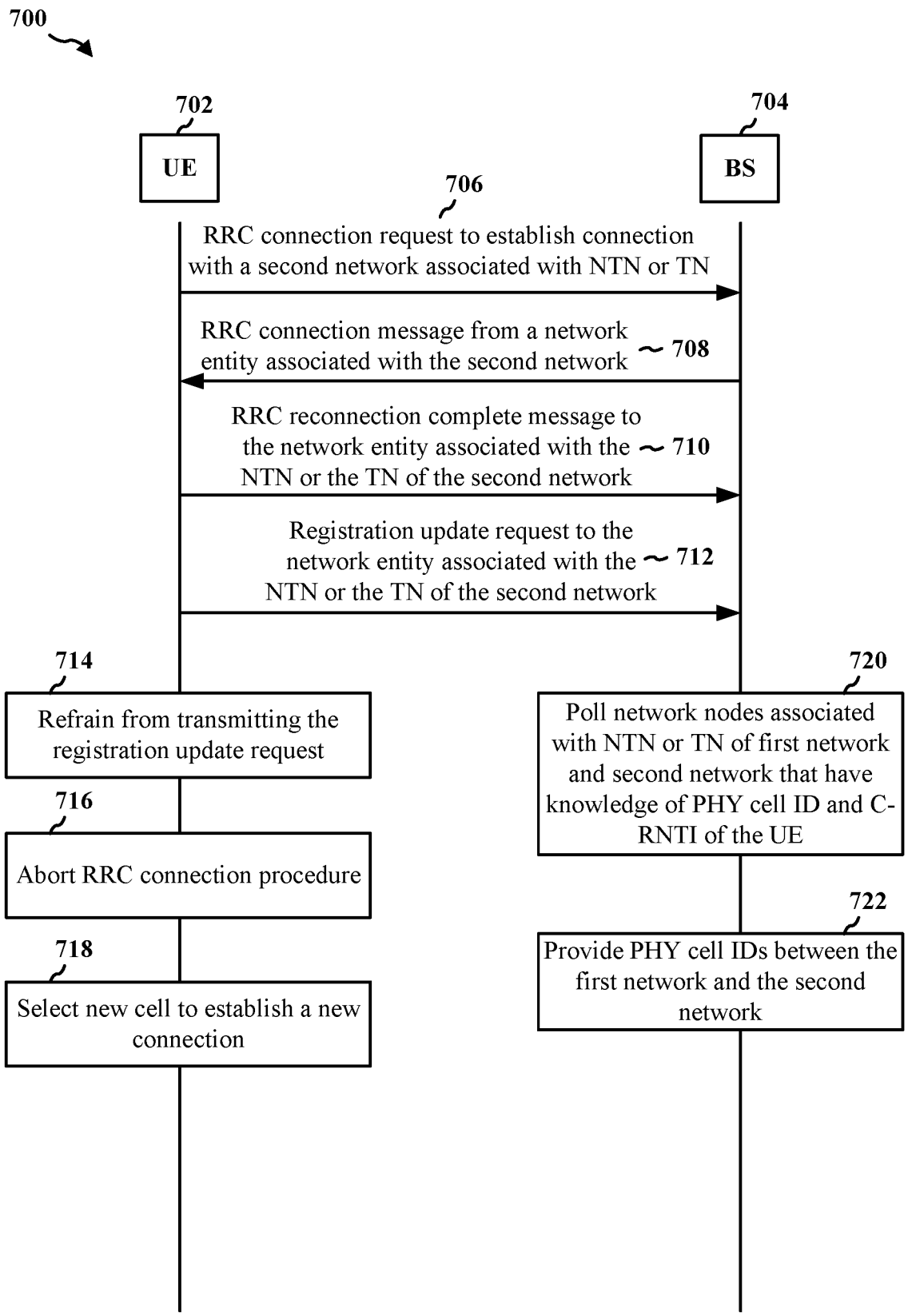
FIG. 7 is a call flow diagram of signaling between a UE and a network entity.

FIG. 7 is a call flow diagram 700 of signaling between a UE 702 and a network entity (e.g., base station) 704. The UE 702 may be configured to communicate with the base station 704. For example, in the context of FIG. 1, the base station 704 may correspond to base station 102. Further, a UE 702 may correspond to at least UE 104. In another example, in the context of FIG. 3, the base station 704 may correspond to base station 310 and the UE 702 may correspond to UE 350.

At 706, the UE may transmit an RRC connection request to establish a connection with a second network associated with one of an NTN or a TN. The UE may be on a first network associated with one of a TN or a NTN. The UE may transmit the RRC connection request to a network entity (e.g., base station 704) associated with the second network. The base station 704 may receive the RRC connection request from the UE 702. In some aspects, the RRC connection request may comprise at least one of a RRC reestablishment request or a RRC resumption request. In some aspects, the RRC reconnection message may comprise one or more downlink NAS packet data units. In some aspects, the RRC connection request comprises a physical (PHY) cell identifier (ID) for one of the NTN or the TN of the first network and a PHY cell ID for one of the NTN or the TN of the second network. For example, the PHY cell ID may comprise an integer value identifying an NTN and/or an integer value identifying a TN. In some aspects, system information may indicate whether the cell associated with the network supports PHY cell IDs for TN and NTN. In some aspects, the RRC connection request may comprise a network field that indicates that the UE was previously connected to the TN or the NTN associated with the first network. The network field may comprise a one-bit field. The one-bit field may indicate that the UE is reestablishing a connection from a different network. For example, if the request is sent to an NTN, then the UE was previously connected to a TN. If the request is sent to a TN, then the UE was previously connected to a TN. In some aspects, a spare bit may be used for the network field. In some aspects, if the network entity does not support reestablishment between a TN and an NTN, then the network entity may send a rejection message or an RRC connection setup message. In some aspects, a dedicated or a physical random access channel (PRACH) partition may be used for differentiation from the RRC connection request. In some instances, the dedicated or PRACH partition may be used for differentiation from message 1 (Msg1). In some aspects, the RRC connection request may be received for a set of allowed public land mobile networks (PLMNs). The RRC connection request may be received for the set of allowed PLMNs in instances of establishing the connection with the second network from the first network. For example, the UE may be allowed to perform RRC reestablishment when moving between a TN and an NTN, or vice versa, for the allowed PLMNs. The UE may be configured as to whether reestablishment between a TN and an NTN is allowed or not. The UE may be configured via RRC signaling or system information. In some aspects, the NTN may comprise at least one of a low Earth orbit (LEO) NTN, a medium Earth orbit (MEO) NTN, or a geostationary Earth orbit (GEO) NTN. In some aspects, the first network and the second network are associated with different radio access technology (RAT) networks. For example, the UE may be on the first network associated with a TN, while the network entity is on the second network associated with a NTN. In another example, the UE may be on the first network associated with a NTN, while the network entity is on the second network associated with a TN. In some aspects, timers associated with at least one of packet data convergence protocol (PDCP), radio link control (RLC), or MAC may be adjusted or restarted for unacknowledged data or undelivered data from the first network during a reestablishment procedure in the second network. The timers associated with at least one of PDCP, RLC, or MAC may be adjusted based on the new configuration of the second network. For example, in instances of unacknowledged data, a timer, such as but not limited to a PDCP DiscardTimer, may be continued without restarting or may be restarted or may be adjusted when data radio bearer (DRB) is reconfigured and DRB is reestablished. In addition, the quality of service (QoS) and radio configuration from the second network may be applied to any pending, unacknowledged, and/or undelivered data from the first network.

At 708, the base station 704 may transmit an RRC reconnection message in response to receive the RRC connection request. The base station 704 may transmit the RRC reconnection message to the UE 702. The UE 702 may receive the RRC reconnection message from the base station 704. In some aspects, the RRC reconnection message may comprise at least one of a RRC reestablishment message, a RRC resumption message, a RRC setup message, or a RRC reject message.

At 710, the UE 702 may transmit an RRC reconnection complete message to the base station 704. The base station 704 associated with one of the NTN or the TN of the second network. The base station 704 may receive the RRC reconnection complete message from the UE 702. For example, in instances where the UE is on a first network associated with a TN, the UE may transmit the RRC reconnection complete message to a network entity on the second network associated with a NTN. In instances where the UE is on a first network associated with a NTN, the UE may transmit the RRC reconnection complete message to the network entity on the second network associated with a TN. In some aspects, the RRC reconnection complete message may comprise at least one of a RRC reestablishment complete message, a RRC resumption complete message, or a RRC setup complete message. In some aspects, the RRC reconnection complete message may be configured to acknowledge reception of the RRC reconnection message. The RRC reconnection complete message may comprise a registration update request.

At 712, the UE 702 may the UE may transmit a registration update request to the base station 704 associated with one of the NTN or the TN of the second network. The base station 704 may receive the registration update request from the UE 702. The UE transmits the registration update request in response to selecting a cell associated with a different network. For example, the UE, previously on a TN, selecting a cell on an NTN indicates to the UE that the UE has moved beyond its registration area. In some instances, system information provided to the UE may indicate whether the selected cell associated with the different network supports or allows reestablishment between different networks. For example, the UE being on a TN may select a cell associated with an NTN of a second network. The NTN may indicate in the system information provided to the UE whether the cell allows reestablishment between TN and NTN. In some aspects, the indication indicating whether the selected cell supports or allows reestablishment between different networks (e.g., between TN and NTN) may be per public land mobile network (PLMN).

At 714, the UE 702 may refrain from transmitting a registration update request. In some aspects, the second network may configure the UE with a new registration area upon establishment of the connection with one of the TN or the NTN associated with the second network, such that the UE may refrain from transmitting the registration update request. For example, the second network may detect that the UE is on a new network and has changed tracking area configuration and may configure the UE with a new registration area for the second network when the UE is connected (e.g., RRC_CONNECTED) with the second network.

At 716, the UE 702 may abort an RRC connection procedure. The UE may abort the RRC connection procedure (e.g., reestablishment or resumption procedure) and enter an idle mode (e.g., RRC_IDLE). The UE may abort the RRC connection procedure in instances where the UE switches networks. For example, the UE may abort the RRC connection procedure in instances where the UE switches from a TN to an NTN, or vice versa. The UE may switch from the TN to the NTN in the process of finding a new cell, and the UE finds a cell associated with the NTN.

At 718, the UE 702 may select a new cell to establish a new connection. The UE may select the new cell to establish the new connection, in response to aborting the RRC connection procedure. The new cell may be associated with the first network or the second network. The first network or the second network may be associated with one of the TN or the NTN.

At 720, the base station 704 may poll one or more network entities of the first network and/or the second network. The base station may poll one or more network entities associated with one of the NTN or the TN of the first network. The base station may poll one or more network entities associated with one of the NTN or the TN of the second network. In some aspects, the base station may poll the one or more network entities associated with one of the NTN or the TN of the first network and the one or more network entities associated with one of the NTN or the TN of the second network that have knowledge of a PHY cell ID and a cell radio network temporary identifier (C-RNTI) of the UE. The base station may poll the one or more network entities of the first and/or the second network to determine if the same PHY cell ID and C-RNTI is being used for other UEs.

Figure 8:
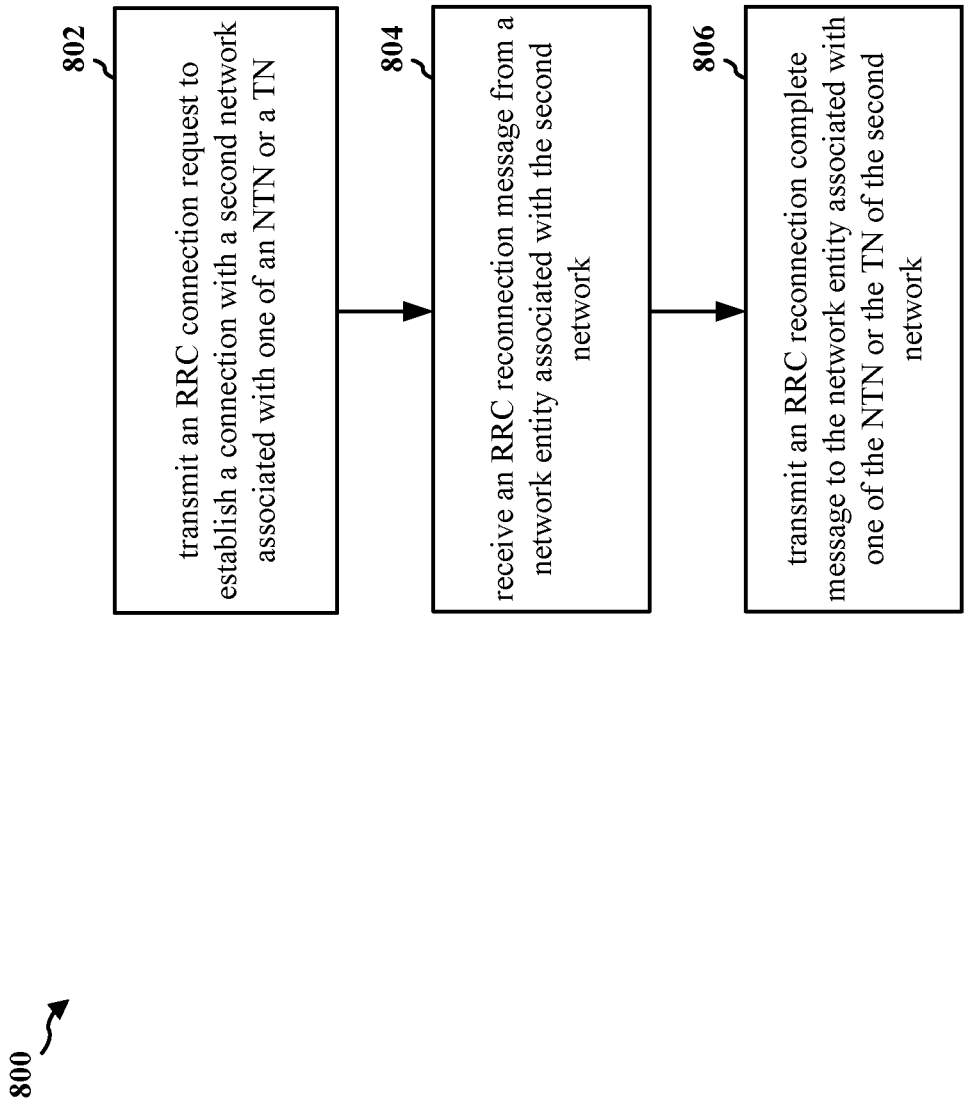
FIG. 8 is a flowchart of a method of wireless communication.

At 722, the base station 704 may provide PHY cell IDs between the first network and the second network, such that no overlapping of the PHY cell IDs occurs between the first network and the second network. For example, the first network may comprise a TN and the second network may comprise a NTN, such that PHY cell IDs may be provided to the TN and the NTN and there is no overlapping of PHY cell IDs between the TN and the NTN. In some aspects, the PHY cell IDs may be grouped between the TN and NTN. The PHY cell ID of the UE may indicate which network the UE 702 was previously connected to. For example, the PHY cell ID of the UE may indicate whether the UE was previously connected to a TN or an NTN. In some aspects, the UE may be previously connected to a high altitude platform system (HAPS) where PHY cell ID may be overlapped or moved away when the UE attempts to connect to a target network entity FIG. 8 is a flowchart 800 of a method of wireless communication. The method may be performed by a UE (e.g., the UE 104; the apparatus 1004). One or more of the illustrated operations may be omitted, transposed, or contemporaneous. The method may allow a UE to perform an RRC reestablishment procedure between a TN and a NTN.

At 802, the UE may transmit an RRC connection request. For example, 802 may be performed by request component 198 of apparatus 1004. The UE may transmit the RRC connection request to establish a connection with a second network associated with one of an NTN or a TN. The UE may be on a first network associated with one of a TN or a NTN. The UE may transmit the RRC connection request to a network entity associated with the second network. In some aspects, the RRC connection request may comprise at least one of a RRC reestablishment request or a RRC resumption request. In some aspects, the RRC reconnection message may comprise one or more downlink NAS packet data units. In some aspects, the RRC connection request comprises a PHY cell ID for one of the NTN or the TN of the first network and a PHY cell ID for one of the NTN or the TN of the second network. For example, the PHY cell ID may comprise an integer value identifying an NTN and/or an integer value identifying a TN. In some aspects, system information may indicate whether the cell associated with the network supports PHY cell IDs for TN and NTN. In some aspects, the RRC connection request may comprise a network field that indicates that the UE was previously connected to the TN or the NTN associated with the first network. The network field may comprise a one-bit field. The one-bit field may indicate that the UE is reestablishing a connection from a different network. For example, if the request is sent to an NTN network, then the UE was previously connected to a TN. In some aspects, a spare bit may be used for the network field. In some aspects, if the network entity does not support reestablishment between a TN and an NTN, then the network entity may send a rejection message or an RRC connection setup message. In some aspects, a dedicated or a PRACH partition may be used for differentiation from the RRC connection request. In some instances, the dedicated or PRACH partition may be used for differentiation from Msg1. In some aspects, the NTN may comprise at least one of a LEO NTN, a MEO NTN, or a GEO NTN. In some aspects, the first network and the second network are associated with different RAT networks. For example, the UE may be on the first network associated with a TN, while the network entity is on the second network associated with a NTN. In some aspects, timers associated with at least one of PDCP, RLC, or MAC may be adjusted or restarted for unacknowledged data or undelivered data from the first network during a reestablishment procedure in the second network. The timers associated with at least one of PDCP, RLC, or MAC may be adjusted based on the new configuration of the second network. For example, in instances of unacknowledged data, a timer, such as but not limited to a PDCP DiscardTimer, may be adjusted or restarted when DRB is reconfigured and DRB is reestablished. In addition, the QoS and radio configuration from the second network may be applied to any pending, unacknowledged, and/or undelivered data from the first network.

At 804, the UE may receive an RRC reconnection message. For example, 804 may be performed by request component 198 of apparatus 1004. The UE may receive the RRC reconnection message from the network entity associated with the second network. In some aspects, the RRC reconnection message may comprise at least one of a RRC reestablishment message, a RRC resumption message, a RRC setup message, or a RRC reject message.

At 806, the UE may transmit an RRC reconnection complete message. For example, 806 may be performed by request component 198 of apparatus 1004. The UE may transmit an RRC reconnection complete message to the network entity associated with one of the NTN or the TN of the second network. For example, in instances where the UE is on a first network associated with a TN, the UE may transmit the RRC reconnection complete message to the network entity on the second network associated with a NTN. In instances where the UE is on a first network associated with a NTN, the UE may transmit the RRC reconnection complete message to the network entity on the second network associated with a TN. In some aspects, the RRC reconnection complete message may comprise at least one of a RRC reestablishment complete message, a RRC resumption complete message, or a RRC setup complete message. In some aspects, the RRC reconnection complete message may be configured to acknowledge reception of the RRC reconnection message. The RRC reconnection complete message may comprise a registration update request.

Figure 9:
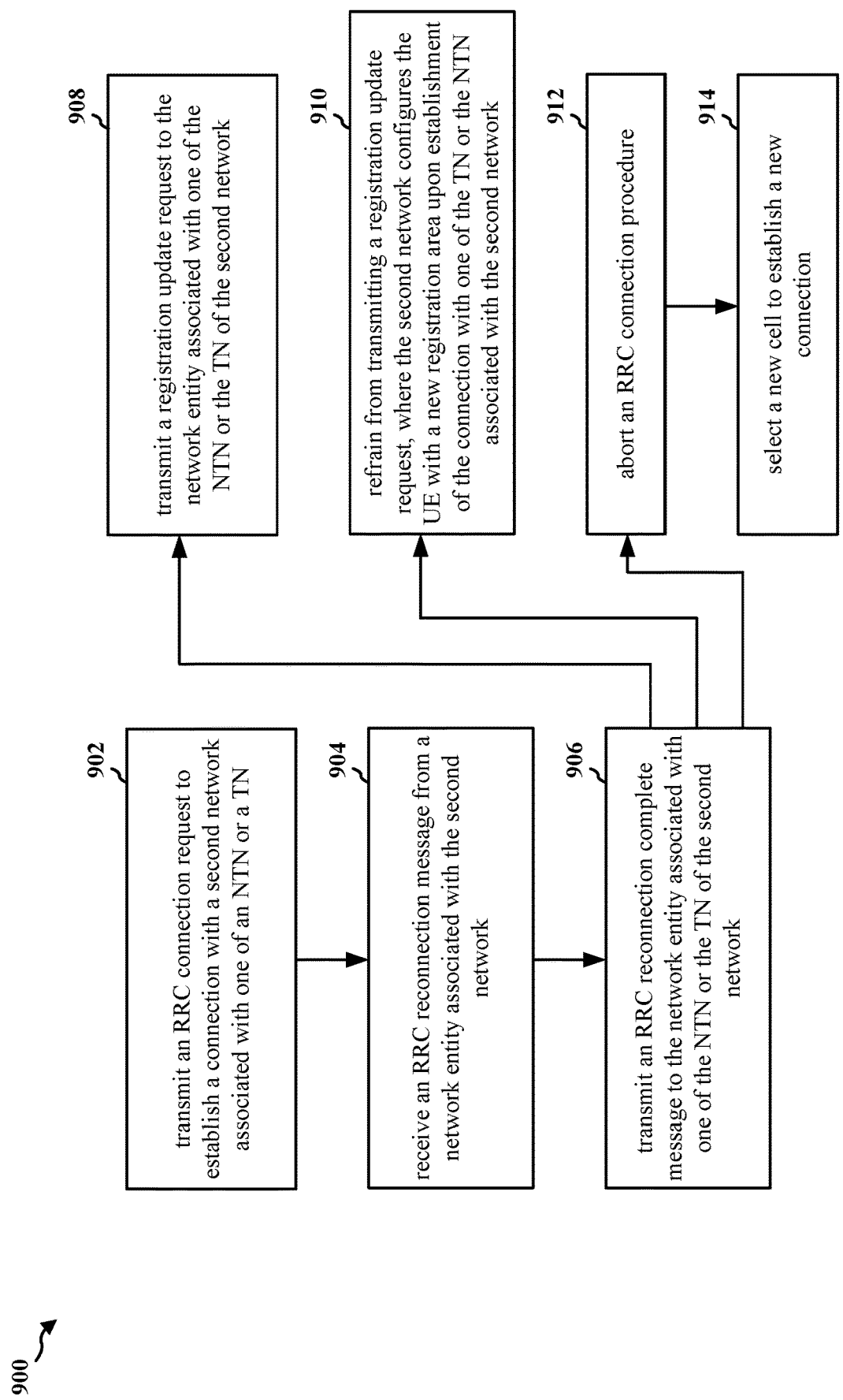
FIG. 9 is a flowchart of a method of wireless communication.

FIG. 9 is a flowchart 900 of a method of wireless communication. The method may be performed by a UE (e.g., the UE 104; the apparatus 1004). One or more of the illustrated operations may be omitted, transposed, or contemporaneous. The method may allow a UE to perform an RRC reestablishment procedure between a TN and a NTN.

At 902, the UE may transmit an RRC connection request. For example, 902 may be performed by request component 198 of apparatus 1004. The UE may transmit the RRC connection request to establish a connection with a second network associated with one of an NTN or a TN. The UE may be on a first network associated with one of a TN or a NTN. The UE may transmit the RRC connection request to a network entity associated with the second network. In some aspects, the RRC connection request may comprise at least one of a RRC reestablishment request or a RRC resumption request. In some aspects, the RRC reconnection message may comprise one or more downlink NAS packet data units. In some aspects, the RRC connection request comprises a PHY cell ID for one of the NTN or the TN of the first network and a PHY cell ID for one of the NTN or the TN of the second network. For example, the PHY cell ID may comprise an integer value identifying an NTN and/or an integer value identifying a TN. In some aspects, system information may indicate whether the cell associated with the network supports PHY cell IDs for TN and NTN. In some aspects, the RRC connection request may comprise a network field that indicates that the UE was previously connected to the TN or the NTN associated with the first network. The network field may comprise a one-bit field. The one-bit field may indicate that the UE is reestablishing a connection from a different network. For example, if the request is sent to an NTN network, then the UE was previously connected to a TN. In some aspects, a spare bit may be used for the network field. In some aspects, if the network entity does not support reestablishment between a TN and an NTN, then the network entity may send a rejection message or an RRC connection setup message. In some aspects, a dedicated or a PRACH partition may be used for differentiation from the RRC connection request. In some instances, the dedicated or PRACH partition may be used for differentiation from Msg1. In some aspects, the NTN may comprise at least one of a LEO NTN, a MEO NTN, or a GEO NTN. In some aspects, the first network and the second network are associated with different RAT networks. For example, the UE may be on the first network associated with a TN, while the network entity is on the second network associated with a NTN. In some aspects, timers associated with at least one of PDCP, RLC, or MAC may be adjusted or restarted for unacknowledged data or undelivered data from the first network during a reestablishment procedure in the second network. The timers associated with at least one of PDCP, RLC, or MAC may be adjusted based on the new configuration of the second network. For example, in instances of unacknowledged data, a timer, such as but not limited to a PDCP DiscardTimer, may be adjusted or restarted when DRB is reconfigured and DRB is reestablished. In addition, the QoS and radio configuration from the second network may be applied to any pending, unacknowledged, and/or undelivered data from the first network.

At 904, the UE may receive an RRC reconnection message. For example, 904 may be performed by request component 198 of apparatus 1004. The UE may receive the RRC reconnection message from the network entity associated with the second network. In some aspects, the RRC reconnection message may comprise at least one of a RRC reestablishment message, a RRC resumption message, a RRC setup message, or a RRC reject message.

At 906, the UE may transmit an RRC reconnection complete message. For example, 906 may be performed by request component 198 of apparatus 1004. The UE may transmit an RRC reconnection complete message to the network entity associated with one of the NTN or the TN of the second network. For example, in instances where the UE is on a first network associated with a TN, the UE may transmit the RRC reconnection complete message to the network entity on the second network associated with a NTN. In instances where the UE is on a first network associated with a NTN, the UE may transmit the RRC reconnection complete message to the network entity on the second network associated with a TN. In some aspects, the RRC reconnection complete message may comprise at least one of a RRC reestablishment complete message, a RRC resumption complete message, or a RRC setup complete message. In some aspects, the RRC reconnection complete message may be configured to acknowledge reception of the RRC reconnection message. The RRC reconnection complete message may comprise a registration update request.

At 908, the UE may transmit a registration update request. For example, 908 may be performed by request component 198 of apparatus 1004. The UE may transmit the registration update request to the network entity associated with one of the NTN or the TN of the second network. The UE transmits the registration update request in response to selecting a cell associated with a different network. For example, the UE selecting a cell from a TN to an NTN indicates to the UE that the UE has moved beyond its registration area. In some instances, the network may indicate in system information whether the selected cell associated with the different network supports or allows reestablishment between different networks. For example, the UE being on a TN may select a cell associated with an NTN of a second network. The NTN may indicate in the system information provided to the UE whether the cell allows reestablishment between TN and NTN. In some aspects, the indication indicating whether the selected cell supports or allows reestablishment between different networks (e.g., between TN and NTN) may be per PLMN.

At 910, the UE may refrain from transmitting a registration update request. For example, 910 may be performed by request component 198 of apparatus 1004. In some aspects, the second network may configure the UE with a new registration area upon establishment of the connection with one of the TN or the NTN associated with the second network, such that the UE may refrain from transmitting the registration update request. For example, the second network may detect that the UE is on a new network and has changed tracking area configuration and may configure the UE with a new registration area for the second network when the UE is connected (e.g., RRC_CONNECTED) with the second network.

At 912, the UE may abort an RRC connection procedure. For example, 912 may be performed by request component 198 of apparatus 1004. The UE may abort the RRC connection procedure (e.g., reestablishment or resumption procedure) and enter an idle mode (e.g., RRC_IDLE). The UE may abort the RRC connection procedure in instances where the UE switches networks. For example, the UE may abort the RRC connection procedure in instances where the UE switches from a TN to an NTN. The UE may switch from the TN to the NTN in the process of finding a new cell, and the UE finds a cell associated with the NTN.

At 914, the UE may select a new cell to establish a new connection. For example, 914 may be performed by request component 198 of apparatus 1004. The UE may select the new cell to establish the new connection, in response to aborting the RRC connection procedure. The new cell may be associated with the first network or the second network. The first network or the second network may be associated with one of the TN or the NTN.

Figure 10:
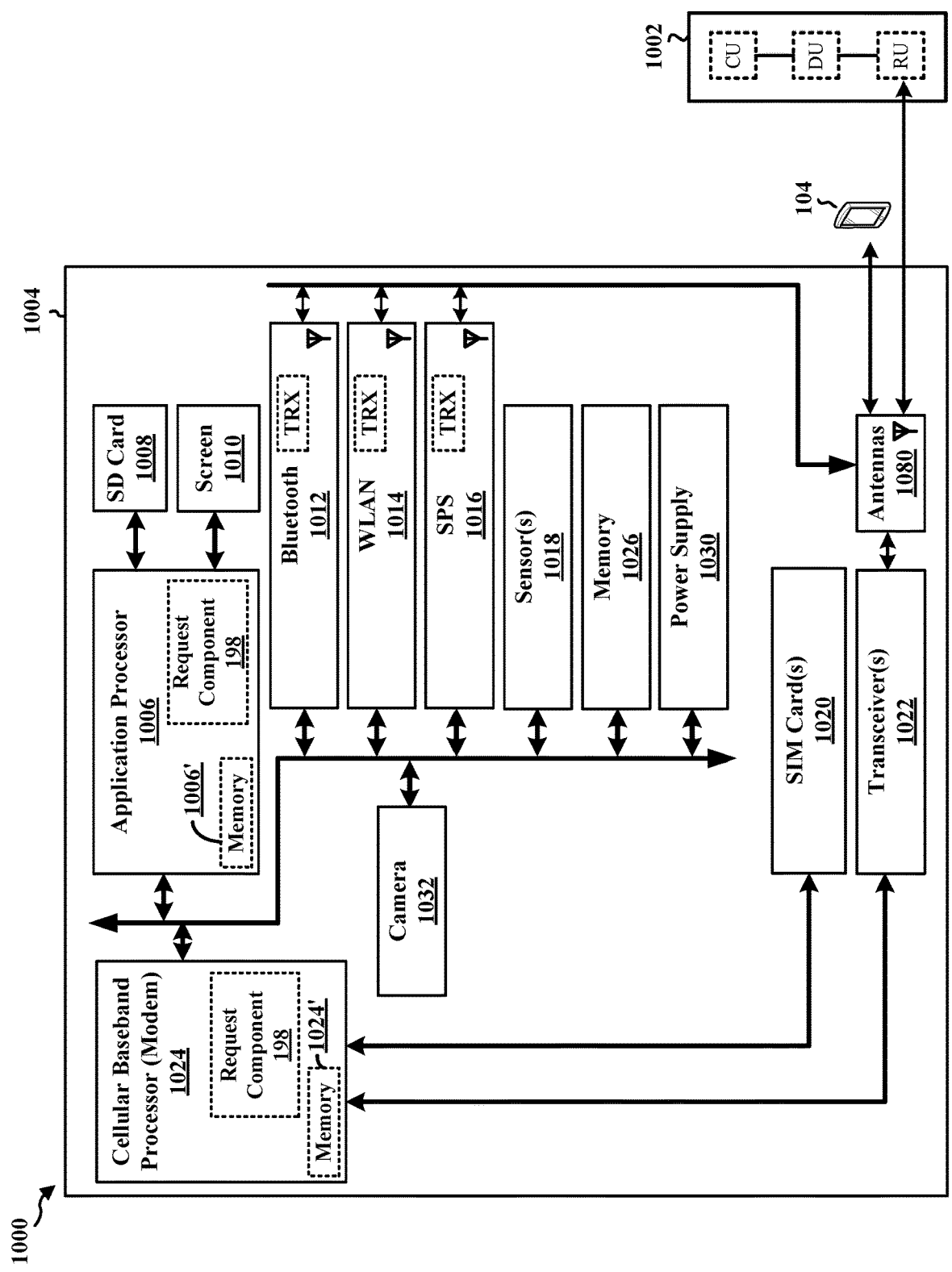
FIG. 10 is a diagram illustrating an example of a hardware implementation for an example apparatus and/or network entity.

FIG. 10 is a diagram 1000 illustrating an example of a hardware implementation for an apparatus 1004. The apparatus 1004 may be a UE, a component of a UE, or may implement UE functionality. In some aspects, the apparatus 1004 may include a cellular baseband processor 1024 (also referred to as a modem) coupled to one or more transceivers 1022 (e.g., cellular RF transceiver). The cellular baseband processor 1024 may include on-chip memory 1024'. In some aspects, the apparatus 1004 may further include one or more subscriber identity modules (SIM) cards 1020 and an application processor 1006 coupled to a secure digital (SD) card 1008 and a screen 1010. The application processor 1006 may include on-chip memory 1006'. In some aspects, the apparatus 1004 may further include a Bluetooth module 1012, a WLAN module 1014, an SPS module 1016 (e.g., GNSS module), one or more sensor modules 1018 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1026, a power supply 1030, and/or a camera 1032. The Bluetooth module 1012, the WLAN module 1014, and the SPS module 1016 may include an on-chip transceiver (TRX) (or in some cases, just a receiver (RX)). The Bluetooth module 1012, the WLAN module 1014, and the SPS module 1016 may include their own dedicated antennas and/or utilize the antennas 1080 for communication. The cellular baseband processor 1024 communicates through the transceiver(s) 1022 via one or more antennas 1080 with the UE 104 and/or with an RU associated with a network entity 1002. The cellular baseband processor 1024 and the application processor 1006 may each include a computer-readable medium/memory 1024', 1006', respectively. The additional memory modules 1026 may also be considered a computer-readable medium/memory. Each computer-readable medium/memory 1024', 1006', 1026 may be non-transitory. The cellular baseband processor 1024 and the application processor 1006 are each responsible for general processing, including the execution of software stored on the computer-readable medium/memory. The software, when executed by the cellular baseband processor 1024/application processor 1006, causes the cellular baseband processor 1024/application processor 1006 to perform the various functions described supra. The computer-readable medium/memory may also be used for storing data that is manipulated by the cellular baseband processor 1024/application processor 1006 when executing software. The cellular baseband processor 1024/application processor 1006 may be a component of the UE 350 and may include the memory 360 and/or at least one of the TX processor 368, the RX processor 356, and the controller/processor 359. In one configuration, the apparatus 1004 may be a processor chip (modem and/or application) and include just the cellular baseband processor 1024 and/or the application processor 1006, and in another configuration, the apparatus 1004 may be the entire UE (e.g., see 350 of FIG. 3) and include the additional modules of the apparatus 1004.

As discussed supra, the component 198 is configured to transmit a RRC connection request to establish a connection with a second network associated with one of the NTN or the TN; receive an RRC reconnection message from a network entity associated with the second network; and transmit an RRC reconnection complete message to the network entity associated with one of the NTN or the TN of the second network. The component 198 may be within the cellular baseband processor 1024, the application processor 1006, or both the cellular baseband processor 1024 and the application processor 1006. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1004 may include a variety of components configured for various functions. In one configuration, the apparatus 1004, and in particular the cellular baseband processor 1024 and/or the application processor 1006, includes means for transmitting a RRC connection request to establish a connection with a second network associated with one of the NTN or the TN. The apparatus includes means for receiving an RRC reconnection message from a network entity associated with the second network. The apparatus includes means for transmitting an RRC reconnection complete message to the network entity associated with one of the NTN or the TN of the second network. The apparatus further includes means for transmitting a registration update request to the network entity associated with one of the NTN or the TN of the second network. The apparatus further includes means for refraining from transmitting a registration update request. The second network configures the UE with a new registration area upon establishment of the connection with one of the TN or the NTN associated with the second network. The apparatus further includes means for aborting an RRC connection procedure. The apparatus further includes means for selecting a new cell to establish a new connection. The new cell is associated with the first network or the second network. The first network or the second network are associated with one of the TN or the NTN. The means may be the component 198 of the apparatus 1004 configured to perform the functions recited by the means. As described supra, the apparatus 1004 may include the TX processor 368, the RX processor 356, and the controller/processor 359. As such, in one configuration, the means may be the TX processor 368, the RX processor 356, and/or the controller/processor 359 configured to perform the functions recited by the means.

Figure 11:
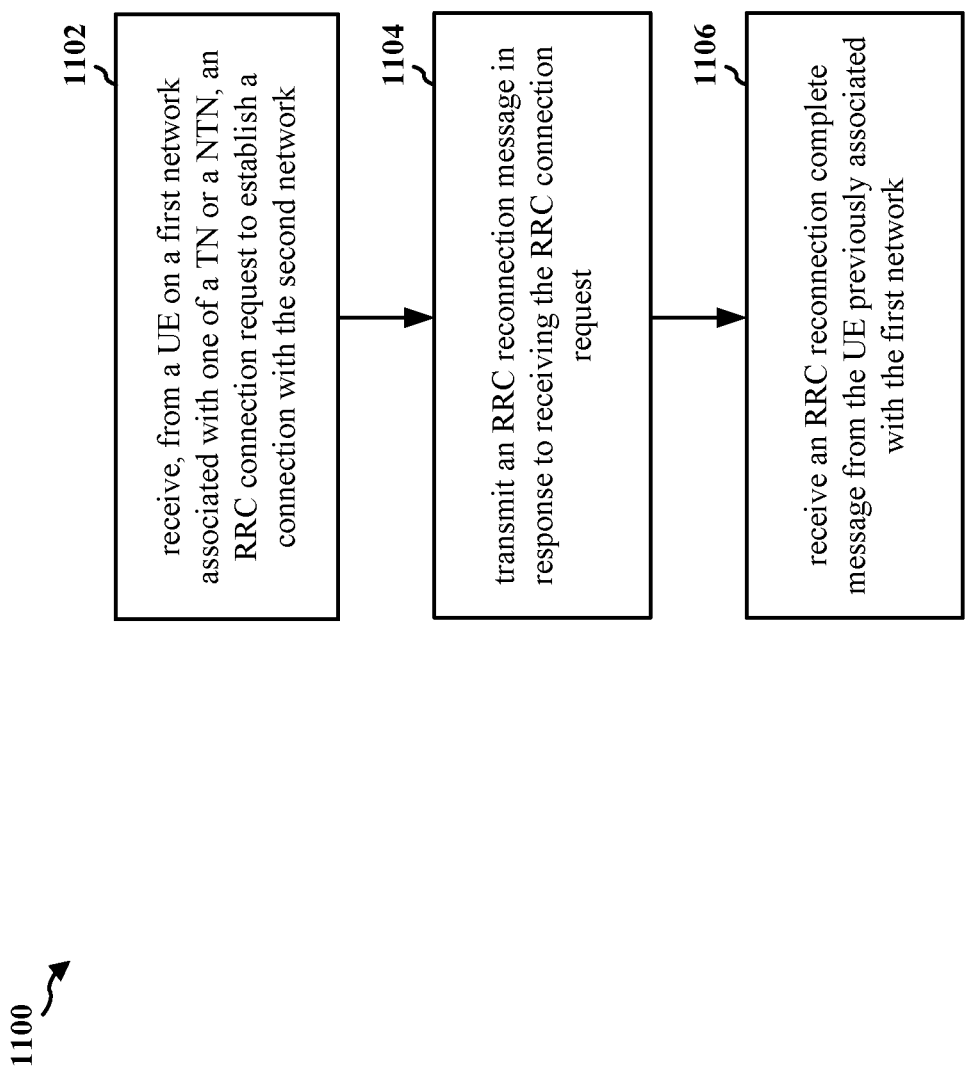
FIG. 11 is a flowchart of a method of wireless communication.

FIG. 11 is a flowchart 1100 of a method of wireless communication. The method may be performed by a network entity (e.g., the base station 102; the network entity 1002. One or more of the illustrated operations may be omitted, transposed, or contemporaneous. The method may allow a network entity to engage in an RRC reestablishment procedure with a UE, such that that UE may switch cells between a TN and a NTN.

At 1102, the network entity may receive an RRC connection request. For example, 1102 may be performed by connection component 199 of network entity 1302. The network entity may receive the RRC connection request from a UE on a first network associated with one of a TN or an NTN. The network entity may be on a second network associated with one of an NTN or a TN. The network entity may receive the RRC connection request from the UE to establish a connection with the second network. In some aspects, the RRC connection request may comprise at least one of a RRC reestablishment request or a RRC resumption request. In some aspects, the RRC reconnection message may comprise one or more downlink NAS packet data units. In some aspects, the RRC connection request comprises a PHY cell ID for one of the NTN or the TN of the first network and a PHY cell ID for one of the NTN or the TN of the second network. For example, the PHY cell ID may comprise an integer value identifying an NTN and/or an integer value identifying a TN. In some aspects, system information may indicate whether the cell associated with the network supports PHY cell IDs for TN and NTN. In some aspects, the RRC connection request may comprise a network field that indicates that the UE was previously connected to the TN or the NTN associated with the first network. The network field may comprise a one-bit field. The one-bit field may indicate that the UE is reestablishing a connection from a different network. For example, if the request is sent to an NTN, then the UE was previously connected to a TN. If the request is sent to a TN, then the UE was previously connected to a TN. In some aspects, a spare bit may be used for the network field. In some aspects, if the network entity does not support reestablishment between a TN and an NTN, then the network entity may send a rejection message or an RRC connection setup message. In some aspects, a dedicated or a PRACH partition may be used for differentiation from the RRC connection request. In some instances, the dedicated or PRACH partition may be used for differentiation from Msg1. In some aspects, the RRC connection request may be received for a set of allowed PLMNs. The RRC connection request may be received for the set of allowed PLMNs in instances of establishing the connection with the second network from the first network. For example, the UE may be allowed to perform RRC reestablishment when moving between a TN and an NTN, or vice versa, for the allowed PLMNs. The UE may be configured as to whether reestablishment between a TN and an NTN is allowed or not. The UE may be configured via RRC signaling or system information. In some aspects, the NTN may comprise at least one of a LEO NTN, a MEO NTN, or a GEO NTN. In some aspects, the first network and the second network are associated with different RAT networks. For example, the UE may be on the first network associated with a TN, while the network entity is on the second network associated with a NTN. In another example, the UE may be on the first network associated with a NTN, while the network entity is on the second network associated with a TN.

At 1104, the network entity may transmit an RRC reconnection message. For example, 1104 may be performed by connection component 199 of network entity 1302. The network entity may transmit the RRC reconnection message in response to receiving the RRC connection request. The network entity may transmit the RRC reconnection message to the UE. In some aspects, the RRC reconnection message may comprise at least one of a RRC reestablishment message, a RRC resumption message, a RRC setup message, or a RRC reject message.

At 1106, the network entity may receive an RRC reconnection complete message. For example, 1106 may be performed by connection component 199 of network entity 1302. The network entity may receive the RRC reconnection complete message from the UE previously associated with the first network. In some aspects, the RRC reconnection complete message may comprise at least one of a RRC reestablishment complete message, a RRC resumption complete message, or a RRC setup complete message. The RRC setup complete may comprise an acknowledgement of the RRC reconnection request message at least based on the second network failing to communicate with the first network. In some aspects, for example, in instances where the UE is on a first network associated with a TN, the UE may transmit the RRC reconnection complete message to the network entity on the second network associated with a NTN. In instances where the UE is on a first network associated with a NTN, the UE may transmit the RRC reconnection complete message to the network entity on the second network associated with a TN.

Figure 12:
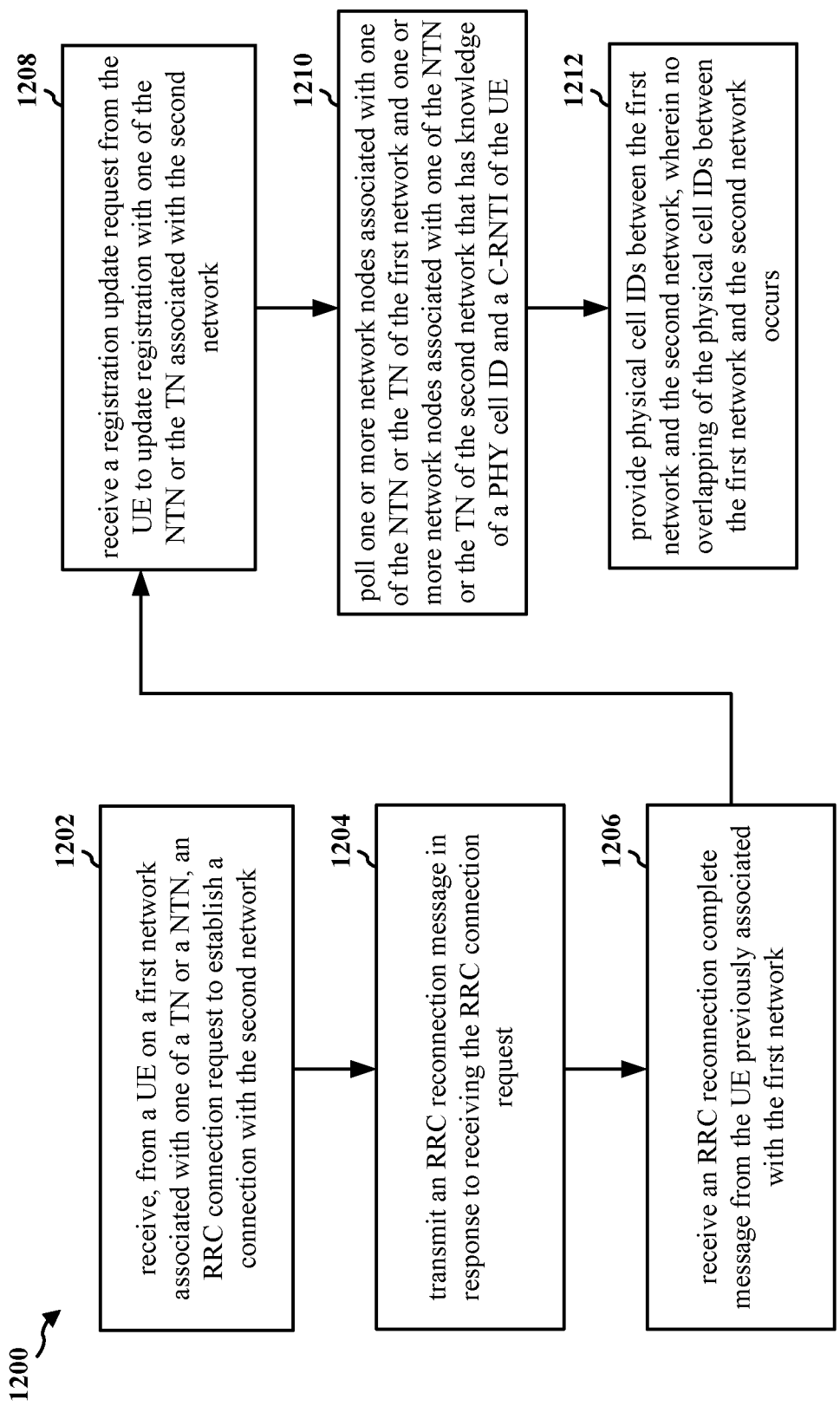
FIG. 12 is a flowchart of a method of wireless communication.

FIG. 12 is a flowchart 1200 of a method of wireless communication. The method may be performed by a base station (e.g., the base station 102; the network entity 1002. One or more of the illustrated operations may be omitted, transposed, or contemporaneous. The method may allow a network entity to engage in an RRC reestablishment procedure with a UE, such that that UE may switch cells between a TN and a NTN.

At 1202, the network entity may receive an RRC connection request. For example, 1202 may be performed by connection component 199 of network entity 1302. The network entity may receive the RRC connection request from a UE on a first network associated with one of a TN or an NTN. The network entity may be on a second network associated with one of an NTN or a TN. The network entity may receive the RRC connection request from the UE to establish a connection with the second network. In some aspects, the RRC connection request may comprise at least one of a RRC reestablishment request or a RRC resumption request. In some aspects, the RRC reconnection message may comprise one or more downlink NAS packet data units. In some aspects, the RRC connection request comprises a PHY cell ID for one of the NTN or the TN of the first network and a PHY cell ID for one of the NTN or the TN of the second network. For example, the PHY cell ID may comprise an integer value identifying an NTN and/or an integer value identifying a TN. In some aspects, system information may indicate whether the cell associated with the network supports PHY cell IDs for TN and NTN. In some aspects, the RRC connection request may comprise a network field that indicates that the UE was previously connected to the TN or the NTN associated with the first network. The network field may comprise a one-bit field. The one-bit field may indicate that the UE is reestablishing a connection from a different network. For example, if the request is sent to an NTN, then the UE was previously connected to a TN. If the request is sent to a TN, then the UE was previously connected to a TN. In some aspects, a spare bit may be used for the network field. In some aspects, if the network entity does not support reestablishment between a TN and an NTN, then the network entity may send a rejection message or an RRC connection setup message. In some aspects, a dedicated or a PRACH partition may be used for differentiation from the RRC connection request. In some instances, the dedicated or PRACH partition may be used for differentiation from Msg1. In some aspects, the RRC connection request may be received for a set of allowed PLMNs. The RRC connection request may be received for the set of allowed PLMNs in instances of establishing the connection with the second network from the first network. For example, the UE may be allowed to perform RRC reestablishment when moving between a TN and an NTN, or vice versa, for the allowed PLMNs. The UE may be configured as to whether reestablishment between a TN and an NTN is allowed or not. The UE may be configured via RRC signaling or system information. In some aspects, the NTN may comprise at least one of a LEO NTN, a MEO NTN, or a GEO NTN. In some aspects, the first network and the second network are associated with different RAT networks. For example, the UE may be on the first network associated with a TN, while the network entity is on the second network associated with a NTN. In another example, the UE may be on the first network associated with a NTN, while the network entity is on the second network associated with a TN.

At 1204, the network entity may transmit an RRC reconnection message. For example, 1204 may be performed by connection component 199 of network entity 1302. The network entity may transmit the RRC reconnection message in response to receiving the RRC connection request. The network entity may transmit the RRC reconnection message to the UE. In some aspects, the RRC reconnection message may comprise at least one of a RRC reestablishment message, a RRC resumption message, a RRC setup message, or a RRC reject message.

At 1206, the network entity may receive an RRC reconnection complete message. For example, 1206 may be performed by connection component 199 of network entity 1302. The network entity may receive the RRC reconnection complete message from the UE previously associated with the first network. In some aspects, the RRC reconnection complete message may comprise at least one of a RRC reestablishment complete message, a RRC resumption complete message, or a RRC setup complete message. The RRC setup complete may comprise an acknowledgement of the RRC reconnection request message at least based on the second network failing to communicate with the first network. In some aspects, for example, in instances where the UE is on a first network associated with a TN, the UE may transmit the RRC reconnection complete message to the network entity on the second network associated with a NTN. In instances where the UE is on a first network associated with a NTN, the UE may transmit the RRC reconnection complete message to the network entity on the second network associated with a TN.

At 1208, the network entity may receive a registration update request. For example, 1208 may be performed by connection component 199 of network entity 1302. The network entity may receive the registration update request from the UE to update registration with one of the NTN or the TN associated with the second network. The network entity may receive the registration update request from the UE in response to the UE selecting a cell associated with a different network. For example, the UE selecting a cell from a TN to an NTN indicates to the UE that the UE has moved beyond its registration area. In some instances, the network may indicate in system information whether the selected cell associated with the different network supports or allows reestablishment between different networks. For example, the UE being on a TN may select a cell associated with an NTN of a second network. The NTN may indicate in the system information provided to the UE whether the cell allows reestablishment between TN and NTN. In some aspects, the indication indicating whether the selected cell supports or allows reestablishment between different networks (e.g., between TN and NTN) may be per PLMN.

At 1210, the network entity may poll one or more network entities of the first network and/or the second network. For example, 1210 may be performed by connection component 199 of network entity 1302. The network entity may poll one or more network entities associated with one of the NTN or the TN of the first network. The network entity may poll one or more network entities associated with one of the NTN or the TN of the second network. In some aspects, the network entity may poll the one or more network entities associated with one of the NTN or the TN of the first network and the one or more network entities associated with one of the NTN or the TN of the second network that have knowledge of a PHY cell ID and a cell radio network temporary identifier (C-RNTI) of the UE. The network entity may poll the one or more network entities of the first and/or the second network to determine if the same PHY cell ID and C-RNTI is being used for other UEs.

At 1212, the network entity may provide PHY cell IDs between the first network and the second network. For example, 1212 may be performed by connection component 199 of network entity 1302. The network entity may provide the PHY cell IDs between the first network and the second network, such that no overlapping of the PHY cell IDs occurs between the first network and the second network. For example, the first network may comprise a TN and the second network may comprise a NTN, such that PHY cell IDs may be provided to the TN and the NTN and there is no overlapping of PHY cell IDs between the TN and the NTN. In some aspects, the PHY cell IDs may be grouped between the TN and NTN. The PHY cell ID of the UE may indicate which network the UE was previously connected to. For example, the PHY cell ID of the UE may indicate whether the UE was previously connected to a TN or an NTN. In some aspects, the UE may be previously connected to a HAPS where PHY cell ID may be overlapped or moved away when the UE attempts to connect to a target network entity.

Figure 13:
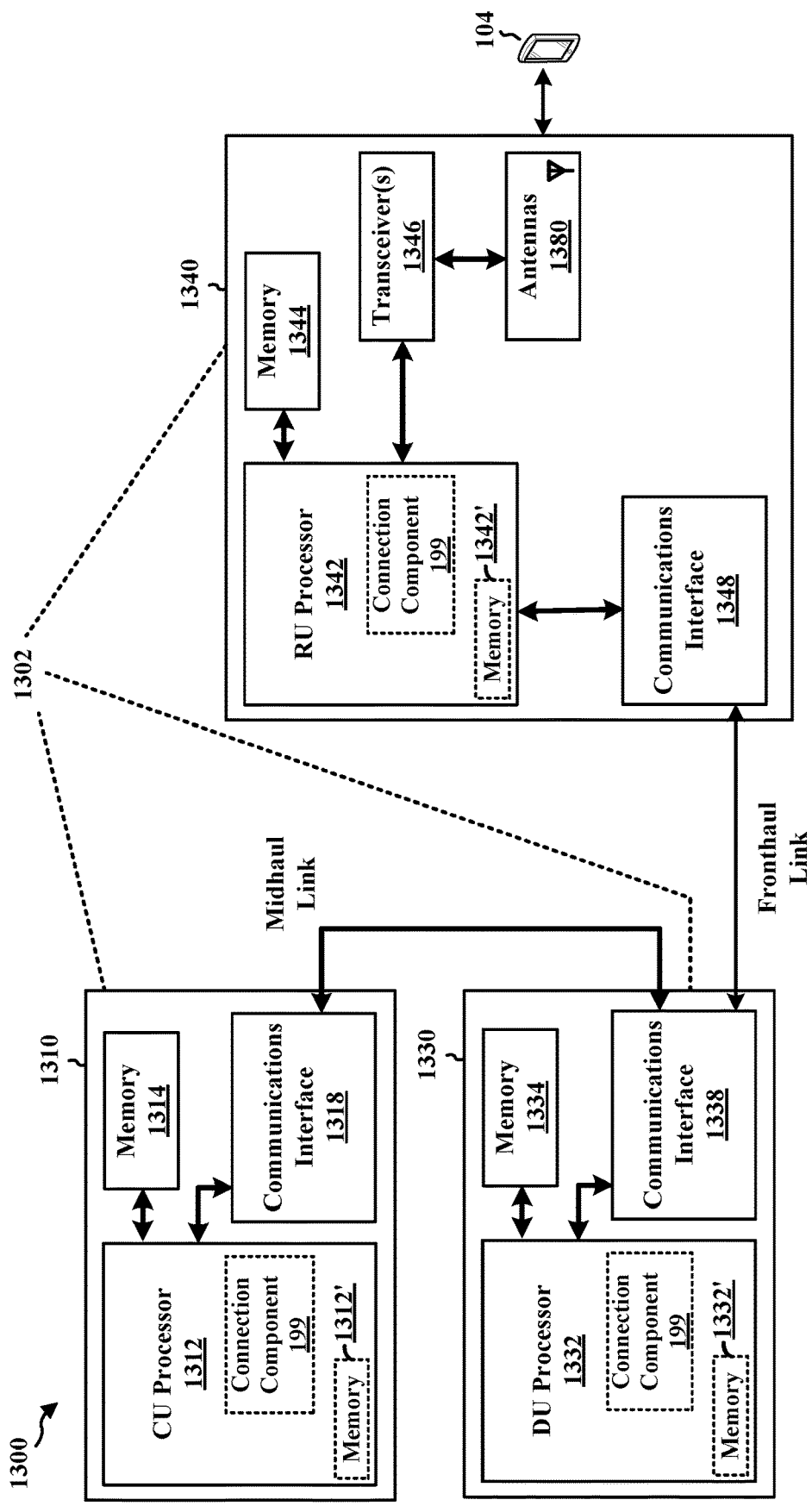
FIG. 13 is a diagram illustrating an example of a hardware implementation for an example network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include a CU processor 1312. The CU processor 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include a DU processor 1332. The DU processor 1332 may include on-chip memory 1332'. In some aspects, the DU 1330 may further include additional memory modules 1334 and a communications interface 1338. The DU 1330 communicates with the RU 1340 through a fronthaul link. The RU 1340 may include an RU processor 1342. The RU processor 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to receive, from a UE on a first network associated with one of the TN or the NTN, a RRC connection request to establish a connection with the second network; transmit an RRC reconnection message in response to receiving the RRC connection request; and receive an RRC reconnection complete message from the UE previously associated with the first network. The component 199 may be within one or more processors of one or more of the CU 1310, DU 1330, and the RU 1340. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1302 may include a variety of components configured for various functions. In one configuration, the network entity 1302 includes means for receiving, from a UE on a first network associated with one of the TN or the NTN, a RRC connection request to establish a connection with the second network. The network entity includes means for transmitting an RRC reconnection message in response to receiving the RRC connection request. The network entity includes means for receiving an RRC reconnection complete message from the UE previously associated with the first network. The network entity further includes means for receiving a registration update request from the UE to update registration with one of the NTN or the TN associated with the second network. The network entity further includes means for polling one or more network entities associated with one of the NTN or the TN of the first network and one or more network entities associated with one of the NTN or the TN of the second network that has knowledge of a PHY cell ID and a C-RNTI of the UE. The network entity further includes means for providing PHY cell IDs between the first network and the second network, wherein no overlapping of the physical cell IDs between the first network and the second network occurs. The means may be the component 199 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE on a first network associated with one of a TN or a NTN, comprising transmitting a radio resource control (RRC) connection request to establish a connection with a second network associated with one of the NTN or the TN; receiving an RRC reconnection message from a network entity associated with the second network; and transmitting an RRC reconnection complete message to the network entity associated with one of the NTN or the TN of the second network.

Aspect 2 is the method of Aspect 1, further includes a transceiver coupled to the at least one processor.

Aspect 3 is the method of any of Aspects 1 and 2, further includes that the RRC connection request comprises at least one of a RRC reestablishment request or a RRC resumption request, wherein the RRC reconnection message comprises at least one of a RRC reestablishment message or a RRC resumption message, a RRC setup message, a RRC reject message, wherein the RRC reconnection complete message comprise at least one of a RRC reestablishment complete message, a RRC resumption complete message, or RRC setup complete message.

Aspect 4 is the method of any of Aspects 1-3, further includes that the RRC reconnection message comprises one or more downlink NAS packet data units.

Aspect 5 is the method of any of Aspects 1-4, further including transmitting a registration update request to the network entity associated with one of the NTN or the TN of the second network.

Aspect 6 is the method of any of Aspects 1-5, further includes that the RRC reconnection complete message is configured to acknowledge reception of the RRC reconnection message, the RRC reconnection complete message comprising a registration update request.

Aspect 7 is the method of any of Aspects 1-6, further including refraining from transmitting a registration update request, wherein the second network configures the UE with a new registration area upon establishment of the connection with one of the TN or the NTN associated with the second network.

Aspect 8 is the method of any of Aspects 1-7, further including aborting an RRC connection procedure; and selecting a new cell to establish a new connection, wherein the new cell is associated with the first network or the second network, wherein the first network or the second network are associated with one of the TN or the NTN.

Aspect 9 is the method of any of Aspects 1-8, further includes that the RRC connection request comprises a network field that indicates that the UE was previously connected to the TN or the NTN, wherein the network field comprises a one-bit field.

Aspect 10 is the method of any of Aspects 1-9, further includes that a dedicated or a PRACH partition is used for differentiation from the RRC connection request.

Aspect 11 is the method of any of Aspects 1-10, further includes that the NTN comprises at least one of a LEO NTN, a MEO NTN, or a GEO NTN.

Aspect 12 is the method of any of Aspects 1-11, further includes that the first network and the second network are associated with different RAT networks.

Aspect 13 is the method of any of Aspects 1-12, further includes that timers associated with at least one of PDCP, RLC, or MAC are adjusted or restarted for unacknowledged data or undelivered data in the first network during a reestablishment procedure in the second network.

Aspect 14 is an apparatus for wireless communication at a UE on a first network associated with one of a TN or a NTN including at least one processor coupled to a memory and at least one transceiver, the at least one processor configured to implement any of Aspects 1-13.

Aspect 15 is an apparatus for wireless communication at a UE on a first network associated with one of a TN or a NTN including means for implementing any of Aspects 1-13.

Aspect 16 is a computer-readable medium storing computer executable code, where the code when executed by a processor causes the processor to implement any of Aspects 1-13.

Aspect 17 is a method for wireless communication at a network entity on a second network associated with one of a NTN or a TN comprising receiving, from a UE on a first network associated with one of the TN or the NTN, a RRC connection request to establish a connection with the second network; transmitting an RRC reconnection message in response to receiving the RRC connection request; and receiving an RRC reconnection complete message from the UE previously associated with the first network.

Aspect 18 is the method of Aspect 17, further includes a transceiver coupled to the at least one processor.

Aspect 19 is the method of any of Aspects 17 and 18, further includes that the RRC connection request comprises at least one of a RRC reestablishment request or a RRC resumption request, wherein the RRC reconnection message comprises at least one of a RRC reestablishment message, a RRC resumption message, a RRC setup message, or a RRC reject message, wherein the RRC reconnection complete message comprises at least one of a RRC reestablishment complete message, a RRC resumption complete message, or a RRC setup complete message.

Aspect 20 is the method of any of Aspects 17-19, further includes that the RRC reconnection message comprises one or more downlink NAS packet data units.

Aspect 21 is the method of any of Aspects 17-20, further including receiving a registration update request from the UE to update registration with one of the NTN or the TN associated with the second network.

Aspect 22 is the method of any of Aspects 17-21, further includes that the RRC reconnection complete message comprises an acknowledgement of the RRC reconnection message, the RRC reconnection complete message comprising a registration update request.

Aspect 23 is the method of any of Aspects 17-22, further includes that the RRC setup message comprises an acknowledgement of the RRC reconnection request message, at least based on the second network failing to communicate with the first network.

Aspect 24 is the method of any of Aspects 17-23, further including polling one or more network entities associated with one of the NTN or the TN of the first network and one or more network entities associated with one of the NTN or the TN of the second network that has knowledge of a PHY cell ID and a C-RNTI of the UE.

Aspect 25 is the method of any of Aspects 17-24, further including providing PHY cell IDs between the first network and the second network, wherein no overlapping of the PHY cell IDs between the first network and the second network occurs.

Aspect 26 is the method of any of Aspects 17-25, further includes that the RRC connection request comprises a PHY cell ID for one of the NTN or the TN of the first network and a PHY cell ID for one of the NTN or the TN of the second network.

Aspect 27 is the method of any of Aspects 17-26, further includes that the RRC connection request comprises a network field that indicates that the UE was previously connected to the TN or the NTN, wherein the network field comprises a one-bit field.

Aspect 28 is the method of any of Aspects 17-27, further includes that a dedicated or a PRACH partition is used for differentiation from the RRC connection request.

Aspect 29 is the method of any of Aspects 17-28, further includes that the RRC connection request is received for a set of allowed PLMNs in instances of establishing the connection with the second network from the first network.

Aspect 30 is the method of any of Aspects 17-29, further includes that the NTN comprises at least one of a LEO NTN, a MEO NTN, or a GEO NTN.

Aspect 31 is the method of any of Aspects 17-30, further includes that the first network and the second network are associated with different RAT networks.

Aspect 32 is an apparatus for wireless communication at a network entity on a second network associated with one of a NTN or a TN including at least one processor coupled to a memory and at least one transceiver, the at least one processor configured to implement any of Aspects 17-30.

Aspect 33 is an apparatus for wireless communication at a network entity on a second network associated with one of a NTN or a TN including means for implementing any of Aspects 17-30.

Aspect 34 is a computer-readable medium storing computer executable code, where the code when executed by a processor causes the processor to implement any of Aspects 17-30.

What is claimed is:

1. An apparatus for wireless communication at a user equipment (UE) on a first network associated with one of a terrestrial network (TN) or a non-terrestrial network (NTN), comprising:
a memory; and
at least one processor coupled to the memory and, base at least in part on information stored in the memory, the at least one processor is configured to:
transmit a radio resource control (RRC) connection request to establish a connection with a second network associated with one of the NTN or the TN, wherein the RRC connection request comprises a network field that indicates that the UE was previously connected to the TN or the NTN, wherein the network field comprises a one-bit field;
receive an RRC reconnection message from a network entity associated with the second network; and
transmit an RRC reconnection complete message to the network entity associated with one of the NTN or the TN of the second network.

2. The apparatus of claim 1, further comprising a transceiver coupled to the at least one processor.

3. The apparatus of claim 1, wherein the RRC connection request comprises at least one of a RRC reestablishment request or a RRC resumption request, wherein the RRC reconnection message comprises at least one of a RRC reestablishment message or a RRC resumption message, a RRC setup message, a RRC reject message, wherein the RRC reconnection complete message comprise at least one of a RRC reestablishment complete message, a RRC resumption complete message, or a RRC setup complete message.

4. The apparatus of claim 1, wherein the RRC reconnection message comprises one or more downlink non-access stratum (NAS) packet data units.

5. The apparatus of claim 1, wherein the at least one processor is further configured to:
transmit a registration update request to the network entity associated with one of the NTN or the TN of the second network.

6. The apparatus of claim 1, wherein the RRC reconnection complete message is configured to acknowledge reception of the RRC reconnection message, the RRC reconnection complete message comprising a registration update request.

7. The apparatus of claim 1, wherein the at least one processor is further configured to:
refrain from transmitting a registration update request, wherein the second network configures the UE with a new registration area upon establishment of the connection with one of the TN or the NTN associated with the second network.

8. The apparatus of claim 1, wherein the at least one processor is further configured to:
abort an RRC connection procedure; and
select a new cell to establish a new connection, wherein the new cell is associated with the first network or the second network, wherein the first network or the second network are associated with one of the TN or the NTN.

9. The apparatus of claim 1 wherein a dedicated or a physical random access channel (PRACH) partition is used for differentiating a rejection message or an RRC connection setup message from the RRC connection request.

10. The apparatus of claim 1, wherein the NTN comprises at least one of a low Earth orbit (LEO) NTN, a medium Earth orbit (MEO) NTN, or a geostationary Earth orbit (GEO) NTN.

11. The apparatus of claim 1, wherein the first network and the second network are associated with different radio access technology (RAT) networks.

12. The apparatus of claim 1, wherein timers associated with at least one of packet data convergence protocol (PDCP), radio link control (RLC), or medium access control (MAC) are adjusted or restarted for unacknowledged data or undelivered data in the first network during a reestablishment procedure in the second network.

13. A method of wireless communication at a user equipment (UE) on a first network associated with one of a terrestrial network (TN) or a non-terrestrial network (NTN), comprising:
transmitting a radio resource control (RRC) connection request to establish a connection with a second network associated with one of the NTN or the TN, wherein the RRC connection request comprises a network field that indicates that the UE was previously connected to the TN or the NTN, wherein the network field comprises a one-bit field;
receiving an RRC reconnection message from a network entity associated with the second network; and
transmitting an RRC reconnection complete message to the network entity associated with one of the NTN or the TN of the second network.

14. An apparatus for wireless communication at a network entity on a second network associated with one of a non-terrestrial network (NTN) or a terrestrial network (TN), comprising:
a memory; and
at least one processor coupled to the memory and, based at least in part on information stored in the memory, the at least one processor is configured to:
receive, from a user equipment (UE) on a first network associated with one of the TN or the NTN, a radio resource control (RRC) connection request to establish a connection with the second network, wherein the RRC connection request comprises a network field that indicates that the UE was previously connected to the TN or the NTN, wherein the network field comprises a one-bit field;
transmit an RRC reconnection message in response to receiving the RRC connection request; and
receive an RRC reconnection complete message from the UE previously associated with the first network.

15. The apparatus of claim 14, further comprising a transceiver coupled to the at least one processor.

16. The apparatus of claim 14, wherein the RRC connection request comprises at least one of a RRC reestablishment request or a RRC resumption request, wherein the RRC reconnection message comprises at least one of a RRC reestablishment message, a RRC resumption message, a RRC setup message, or a RRC reject message, wherein the RRC reconnection complete message comprises at least one of a RRC reestablishment complete message, a RRC resumption complete message, or a RRC setup complete message.

17. The apparatus of claim 14, wherein the RRC reconnection message comprises one or more downlink non-access stratum (NAS) packet data units.

18. The apparatus of claim 14, wherein the at least one processor is further configured to:
receive a registration update request from the UE to update registration with one of the NTN or the TN associated with the second network.

19. The apparatus of claim 14, wherein the RRC reconnection complete message comprises an acknowledgement of the RRC reconnection message, the RRC reconnection complete message comprising a registration update request.

20. The apparatus of claim 14, wherein an RRC setup complete message comprises an acknowledgement of the RRC reconnection message, at least based on the second network failing to communicate with the first network.

21. The apparatus of claim 14, wherein the at least one processor is further configured to:
poll one or more network entities associated with one of the NTN or the TN of the first network and one or more network entities associated with one of the NTN or the TN of the second network that has knowledge of a physical (PHY) cell identifier (ID) and a cell radio network temporary identifier (C-RNTI) of the UE.

22. The apparatus of claim 14, wherein the at least one processor is further configured to:
provide physical (PHY) cell identifiers (IDs) between the first network and the second network, wherein no overlapping of the PHY cell IDs between the first network and the second network occurs.

23. The apparatus of claim 14, wherein the RRC connection request comprises a physical (PHY) cell identifier (ID) for one of the NTN or the TN of the first network and a PHY cell ID for one of the NTN or the TN of the second network.

24. The apparatus of claim 14, wherein a dedicated or a physical random access channel (PRACH) partition is used for differentiating a rejection message or an RRC connection setup message from the RRC connection request.

25. The apparatus of claim 14, wherein the RRC connection request is received for a set of allowed public land mobile networks (PLMNs) in instances of establishing the connection with the second network from the first network.

26. The apparatus of claim 14, wherein the NTN comprises at least one of a low Earth orbit (LEO) NTN, a medium Earth orbit (MEO) NTN, or a geostationary Earth orbit (GEO) NTN.

27. The apparatus of claim 14, wherein the first network and the second network are associated with different radio access technology (RAT) networks.

28. A method of wireless communication at a network entity on a second network associated with one of a non-terrestrial network (NTN) or a terrestrial network (TN), comprising:
- receiving, from a user equipment (UE) on a first network associated with one of the TN or the NTN, a radio resource control (RRC) connection request to establish a connection with the second network, wherein the RRC connection request comprises a network field that indicates that the UE was previously connected to the TN or the NTN, wherein the network field comprises a one-bit field;
- transmitting an RRC reconnection message in response to receiving the RRC connection request; and
- receiving an RRC reconnection complete message from the UE previously associated with the first network.

* * * * *